US012439203B2

(12) United States Patent
Zhang et al.

(10) Patent No.: US 12,439,203 B2
(45) Date of Patent: Oct. 7, 2025

(54) DIVISIVE NORMALIZATION METHOD, DEVICE, AUDIO FEATURE EXTRACTOR AND A CHIP

(71) Applicant: ShenZhen SynSense Technology Co., Ltd., Guangdong (CN)

(72) Inventors: Huaqiu Zhang, Guangdong (CN); Saeid Haghighatshoar, Guangdong (CN); Dylan Richard Muir, Guangdong (CN); Hao Liu, Guangdong (CN); Peng Zhou, Guangdong (CN); Ning Qiao, Guangdong (CN)

(73) Assignee: ShenZhen SynSense Technology Co., Ltd., Guongdong (CN)

( * ) Notice: Subject to any disclaimer, the term of this patent is extended or adjusted under 35 U.S.C. 154(b) by 202 days.

(21) Appl. No.: 18/020,282

(22) PCT Filed: Mar. 24, 2022

(86) PCT No.: PCT/CN2022/082719
§ 371 (c)(1),
(2) Date: Feb. 8, 2023

(87) PCT Pub. No.: WO2023/137861
PCT Pub. Date: Jul. 27, 2023

(65) Prior Publication Data

US 2023/0300529 A1 Sep. 21, 2023

(30) Foreign Application Priority Data

Jan. 18, 2022 (CN) ......................... 202210051924.9

(51) Int. Cl.
*H04S 3/00* (2006.01)
*H04R 3/04* (2006.01)

(52) U.S. Cl.
CPC ............... *H04R 3/04* (2013.01); *H04S 3/008* (2013.01); *H04S 2400/01* (2013.01)

(58) Field of Classification Search
CPC ................................ G10L 15/20; G10L 25/84
See application file for complete search history.

(56) References Cited

U.S. PATENT DOCUMENTS

2011/0238418 A1* 9/2011 Wang ...................... G10L 25/84 704/E15.039
2019/0115011 A1* 4/2019 Khellah ................. G10L 15/02
2021/0352428 A1 11/2021 Prospero et al.

FOREIGN PATENT DOCUMENTS

CN 104133851 A 11/2014
CN 110139206 A 8/2019
(Continued)

OTHER PUBLICATIONS

Dewei Wang et al. "A Background Noise and Process-Variation-Tolerant 109nW Acoustic Feature Extractor Based on Spike-Domain Divisive Energy Normalization for an Always-On Spotting Devise," IEEE International Solid-State Circuits Conference (ISSCC) Mar. 3, 2021 p. 160-161 (Year: 2021).*
(Continued)

*Primary Examiner* — James K Mooney
(74) *Attorney, Agent, or Firm* — Michael D. Eisenberg; MDE Patents

(57) ABSTRACT

A divisive normalization method, device, audio feature extractor, and a chip are disclosed. For improving the robustness against variations of the background noise, the proposed per-channel divisive normalization method comprises: obtaining an average number of input spikes over an averaging window by a low-pass filter to produce a threshold parameter, then deciding whether to enable an integrate-and fire (IAF) counter counting over a clock period of a divisive normalization module, when the count value of IAF
(Continued)

counter reaches the threshold, resetting IAF counter and producing a single spike at the output. Compared with the prior art, the proposed method does not require any Linear Feedback Shift Register (LFSR) and is easier to implement. It also has a simpler structure, higher accuracy and better statistical performance, and a lower cost and a lower power consumption.

19 Claims, 7 Drawing Sheets

(56) References Cited

FOREIGN PATENT DOCUMENTS

| | | | |
|---|---|---|---|
| CN | 114093377 | A | 2/2022 |
| WO | 2021231036 | A1 | 11/2021 |

OTHER PUBLICATIONS

International Search Report and the Written Opinion Dated Jan. 18, 2022 From the International Searching Authority Re. Application No. PCT/CN2022/082719.

Dewei Wang et al. "A Background Noise and Process-Variation-Tolerant 109nW Acoustic Feature Extractor Based on Spike-Domain Divisive Energy Normalization for an Always-On Spotting Devise," IEEE International Solid-State Circuits Conference (ISSCC) Mar. 3, 2021 (Mar. 3, 2021) ISSN: 2376-8606 p. 160-161, figure 9.9.4.

* cited by examiner

Fig. 17
PostNF in REF1
PostNF in our patent
PreNF
time(s)

DIVISIVE NORMALIZATION METHOD, DEVICE, AUDIO FEATURE EXTRACTOR AND A CHIP

CROSS REFERENCE TO RELATED APPLICATIONS

The disclosure is a US national phase application based upon an International Application No. PCT/CN2022/082719, filed on Mar. 24, 2022, titled "DIVISIVE NORMALIZATION METHOD, DEVICE, AUDIO FEATURE EXTRACTOR AND A CHIP", which claims priority to Chinese patent application No. 202210051924.9 titled "DIVISIVE NORMALIZATION METHOD, DEVICE, AUDIO FEATURE EXTRACTOR AND A CHIP", filed with the National Intellectual Property Administration on Jan. 18, 2022, which is incorporated by reference in the present application in its entirety.

1. FIELD OF DISCLOSURE

The present disclosure relates to a divisive normalization (DN) method, device, audio feature extractor, and a chip, and more particularly, to normalize background noise in audio signal processing.

2. DESCRIPTION OF RELATED ART

Audio signal processing in chip usually uses audio front end that processes the signal collected by the microphone to extract audio feature, which are encoded and delivered to classifier (e.g., spiking neural network, SNN). FIG. 1 is a diagram of audio feature extractor in prior art. The audio feature extractor can be used for always-on keyword spotting (KWS), voice activity detection (VAD), vibration anomaly detection, smart agriculture, animals wear, ambient sound detection, etc.

An audio front end implemented by analog signal processing (ASP) is shown in FIG. 2(*a*) or FIG. 2(*b*). The original audio signal is collected by the microphone amplified by a low-noise amplifier (LNA), which is then filtered by a bandpass filter (BPF) in each of the 16 parallel channels. In every channel, there is BPF, rectifier and Leaky-Integrate-and fire (LIF), etc. Each filter is a module that preserve only a fraction of the input audio signal whose frequency matches the central frequency of the filter to detect signal activity at different frequencies across time. Recent literature has shown that the pattern of signal activity in frequency and time contains relevant information for audio classification tasks. The output of each filter is then passed through a rectifier (also illustrated in FIG. 2(*a*) or FIG. 2(*b*)), which takes the pass-band signal coming out of the filter and extracts its envelope (amplitude). The envelop is a positive signal and enables to measure the instantaneous power coming out of each filter across time.

Using the AFE (Audio front end) filter-banks enables one to detect signal activity at different frequencies across time, and signal activity in frequency and time contains relevant information for audio classification tasks. For example, when a keyword is uttered in an audio classification task, depending on the frequency pattern of the uttered keyword the envelope of the signal coming out of the corresponding AFE filters illustrates a peak. As a result, by watching and tracking the amplitude/instantaneous power of the output of filter-bank, one may track the frequency pattern of the input audio in time.

For example, detecting pig-cough in a background farm noise, when there is no pig-cough, the output of the audio front end filter-bank shows an almost-stationarity background noise in frequency-time domain. Consider the same scenario with the difference that when a pig starts coughing, the output of the audio front end in the frequency-time domain changes. Comparing the two cases illustrates variation in activity pattern in frequency-time as a pig starts coughing. Output of each filter is converted to spikes where the rate (number of spikes per time unit) is proportional to the instantaneous power at the output of the filter across time. Then, the produced spikes are then used for training, classification, and further signal processing in the SNN layer following the audio font end.

In practical applications, although there is no desired signal activity (e.g., pig cough in the example above) audio front end keeps producing spikes due to the presence of background noise. This is not a big issue since it can be handled properly and suppressed by the SNN in the next layer provided that the background noise is stationary, namely, its power remains almost the same in the frequency-time domain. However, in scenarios such as background street noise, the received power fluctuates as cars are approaching and then moving away. In those cases, the spike rate produced by audio front end is also changing with time and it may be mistaken as the desired signal itself.

FIG. 3 is the illustration of the variation of the background noise at the output of a specific filter in the ASP. It is seen that when a car approaching and moving away, the background noise power increases and then decreases. Also, one can observe the peaks in the instantaneous power because of the presences of the desired signal at specific time intervals. FIG. 4 is the illustration of FIG. 2 after suitable divisive normalization (DN) in the same scenario, Wherein in FIG. 3 and FIG. 4, high peaks correspond to the signal (e.g., 3 peaks in this plot), and fluctuations in between belong to the background noise. Comparing these two figures, it is not difficult to see that without proper normalization of the background noise, fluctuation in the instantaneous power of the background can be potentially mis-classified as the presence of the desired signal, and with proper normalization of the background noise, the background noise is reduced to a constant level. By comparing FIG. 4 and FIG. 3, one may think that DN is indeed very easy to do, at least visually by just looking at the instantaneous power, so it should be essentially doable by the SNN in the next layer after suitable training. Meanwhile, one may not need to do any DN after all. In fact, this observation is true, however, such processing and normalization through the SNN requires observing and storing the instantaneous power information over a very long period, which is quite costly and difficult to do in practice. As a result, we need to add such a DN module to the audio front end to process the background noise to improve the accuracy of classifier.

SUMMARY

To solve or avoid the part of or whole problems, this invention implements it though the solutions as follows:

According to an embodiment of the present invention, a divisive normalization method is disclosed. The divisive normalization method comprising: S1. Receive input spikes train. S2. Yield the averaged values of the spike number or rate in an averaging window to produce threshold parameter. S3. Decide whether to enable an integrate-and-fire(IAF) counter counting via the number of input spikes in each clock period, and when the count value of the integrate-and-fire counter reaches the threshold, produce a single output spike and reset, wherein the averaging window size comprises at least one frame period, and the frame period comprises at least one clock period, and the threshold is the sum of the average and a constant greater than zero.

In some embodiments, wherein said S2 specifically comprises averaging the spike number or rate by a low-pass filter to produce the threshold parameter.

In some embodiments, the low-pass filter of the divisive normalization method tracks and saves N(t) according to the following update equation; the N(t) computed by the low-pass filter is used to produce M(t)=N(t)>>b which is then used as a threshold parameter for the IAF counter, where b denotes the bit-shift size, t denotes the frame number/label, E(t) and M(t) denote the number/average number of spikes over a frame, and M(t) is N(t)>>b.

In some embodiments, step S3 specifically comprises count-down counter receives the number of input spikes and counts down in every clock period. Compare the output of count-down counter and 0 and as far as it is larger than 0, the local clock pulses are forwarded to integrate and fire counter wherein these pulses are counted and a spike is produced when their count reaches the integrate and fire counter threshold.

In some embodiments, the averaging window size of the divisive normalization method is equal to 2b×frame period.

In some embodiments, the bit-shift parameter b or/and local clock pulses or/and frame period of the divisive normalization method is adjustable.

In some embodiments, input spikes of the divisive normalization method can be asynchronous spikes or synchronous spikes.

According to a second aspect of the present invention, A divisive normalization device comprising: input module, which receives input spikes train; the first counter module, which count the number of input spikes over a frame period, and average the spike numbers using a low-pass filter to produce the threshold parameter. normalization module, which decides whether to enable the Integrate-and fire (IAF) counter counting via the number of input spikes over a clock period, when the count value of the integrate-and-fire counter reaches the threshold, it produces a single spike at the output and resets the counter. Wherein the averaging window size comprises at least one frame period, and the frame period comprises at least one clock period, and the threshold is the sum of the average and a constant greater than zero.

In some embodiments, the normalization module doesn't comprise LFSR.

In some embodiments, the threshold calculation module comprises a first counter module and a low-pass filter, wherein the first counter module obtains the spike number or rate over a frame period, then averaging the spike number by a low-pass filter to produce the threshold parameter.

In some embodiments, the low-pass filter of the normalization module tracks and saves N(t) according to the following update equation; the N(t) computed by the low-pass filter is used to produce M(t)=N(t)>>b which is then used as a threshold parameter for the IAF counter, where b denotes the bit-shift size, t denotes the frame number/label, E(t) and M(t) denote the number/average number of spikes over a frame, and M(t) is N(t)>>b.

In some embodiments, the normalization module comprises the second counter module, count-down counter, spike generator and integrate and fire counter. The second counter module counts the number of input spikes over a clock period, then loads into count-down counter, and the result of count-down counter increases by the number of input spikes received and decreases by 1 at that clock period. spike generator compares the output of count-down counter with 0 and as far as it is larger than 0, the local clock pulses are forwarded to integrate and fire counter wherein these pulses are counted and a spike is produced when their count reaches the integrate and fire counter threshold.

In some embodiments, the normalization module comprising multiplier for increasing the number of input spikes obtained during a clock cycle.

In some embodiments, the input spikes of the normalization module can be asynchronous spikes or synchronous spikes. When input spikes are asynchronous spikes, both the first counter module and second counter module are comprising two counters for alternate count, and the two counters have no clock. When input spikes are asynchronous spikes, convert the asynchronous spikes to synchronous spikes, then counted by a counter having clock. When input spikes are synchronous spikes, both the first counter module and second counter module are comprising a counter having clock and a register.

In some embodiments, the two counters having no clock and can be ripple counters, or/and the counter having clock is digital counter.

According to a third aspect of the present invention, an audio front end processes the original audio signal collected by microphone and yields pre-normalized spikes (PreNF) train for each channel, and divisive normalization method or divisive normalization device above process the pre-normalized spikes train for corresponding channel and yield post-normalized spikes train.

In some embodiments, audio front end comprises low-noise amplifier (LNA) that amplifies the audio signal, which is then filtered by BPF in each of multiple channels. And audio front end comprises a rectifier is coupled to the output of the BPF to rectify, and an event production module is coupled to the output of the rectifier to produce pre-normalized spikes (PostNF) train.

In some embodiments, audio front end comprises a selector to decide whether to normalize the pre-normalized spikes train to post-normalized spikes train.

In some embodiments, also comprises AER encoder for encoding the input spikes or output spikes of the divisive normalization device, wherein said AER encoder can be integrated into the divisive normalization device or placed outside the divisive normalization device.

According to a fourth aspect of the present invention, a chip, comprising normalized audio feature extractor (NAFE) above and a classifier executing the classification task depending on the output spikes of the audio feature extractor.

In some embodiments, the classifier of the chip can be decision tree or neural network, and neural network can be BNN, DNN or SNN.

In some embodiments, the chip also comprises AER to SAER module to process the output spikes of the audio feature extractor before it is passed to the classifier.

Part or all embodiments of the invention are improved on the basic of the prior art. A new architecture of divisive normalization with simpler and easier structure, better statistical performance and lower power consumption is implemented. Specifically, part of or whole embodiments have the following beneficial technical effects:

(1) The invention improves the implementation of LPF, has no latency, avoids the problems of quantization and rate dead-zone, and has higher accuracy.

(2) Divisive normalization without LFSR is easier to be implemented, has a simpler structure, a lower cost, a lower power consumption and chip area, has no single-channel statistical distortion and cross-channel statistical distortion.

(3) The prior art uses random numbers produced by an LFSR to produce the output spikes. Thus, the divisive normalization module may produced random spikes especially at times in which there is no input spikes. Divisive normalization of the invention, in contrast, preserves the location (support) of the spikes.

(4) Divisive normalization of the invention can be configured with better flexibility, and can adapt to different audio signal processing scenarios.

(5) Divisive normalization of the invention can process asynchronous input spikes or synchronous input spikes.

(6) The invention retains the integrity of input spikes information and the independence between different channels with better robustness, higher accuracy, faster processing speed and lower power consumption.

More beneficial effects are introduced in preferred implements.

The disclosed solutions/characters above are aimed at generalizing the solutions, characters in the description below. But they may not be the same solution completely. But the solutions disclosed here are also parts of solutions disclosed in this invention. The characters disclosed here, the characters disclosed in description and the contents in the attached figures but not described explicitly are combined reasonably to disclose more solutions.

The solutions combined by the whole characters disclosed in any place of this invention are used for the summary of technical solutions, modification of application files and disclosure of solutions.

BRIEF DESCRIPTION OF DRAWINGS

FIG. 2(*b*) is another embodiment of ASP in prior art.

FIG. 9(*b*) is the averaging window of instantaneous power E(t) in DN with centers at t1.

DETAILED DESCRIPTION OF EMBODIMENTS

Figure 1:
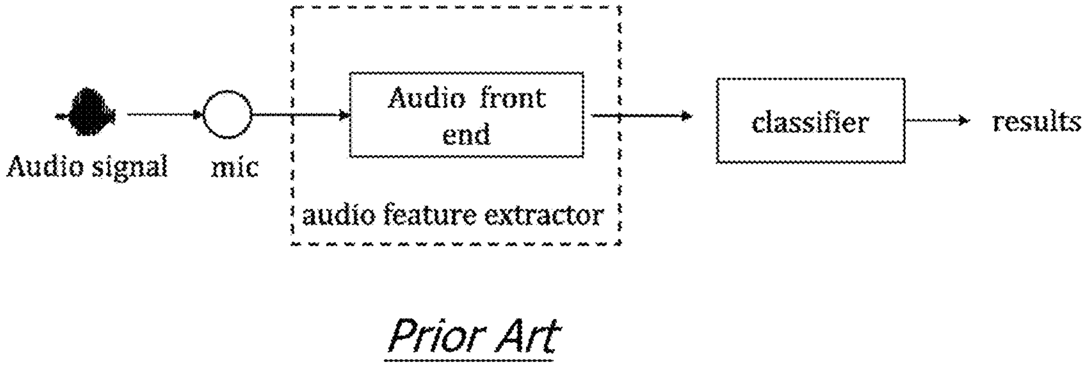
FIG. 1 is a diagram of audio feature extractor in prior art.

Because we can't depict the whole effective solutions, we will introduce the key contents in the solution of each implement clearly and completely referring to the attached figures. The solutions and details which were not disclosed in the words below are the targets or technical characters that can be implemented by common methods in this field. Constrained by words, we won't disclose that here.

Unless it means division, the character "/" means "OR" logic in any place of this invention. The descriptions such as "the first", "the second" are used for discrimination, not for the absolute order in spatial or temporal domain, and not indicate that the same terminologies defined by this description and other attributes mustn't refer to the same object.

This invention will disclose the key contents for compositing different implements, and these key contents constitute different methods and productions. In this invention, even though the key contents are only described in methods/productions, that indicates the corresponding productions/methods comprise the same key contents explicitly.

The procedure, module or character depicted in any place of this invention, does not indicate it excludes others. The technician of art may get other implements with the help of other methods after reading the disclosed solutions in this invention. Based on the key contents of the implements in this invention, the technician of art has the ability to substitute, delete, add, combine, adjust the order of some characters, but get a solution still following the basic idea of this invention. These solutions within the basic idea are also located in the protection field of this invention. Some important terms and symbols:

Audio front end splits the audio signal collected by the microphone into multiple channels in the frequency domain. It can be implemented in the analog domain, digital domain or hybrid digitial-analog. Each channel of the audio front end has an independent DN module (e.g., a total of 16 DN modules corresponding to 16 filters).

Divisive normalization (DN) module performs a suitable normalization of the background noise in each channel so that the background noise is reduced to a constant level (e.g., white noise), and it can be handled properly and suppressed by the SNN in the next layer. The main purpose of divisive normalization is to make sure that the minimum output spike rate (or called background spike firing rate) does not vary by slow variation of the background noise.

Spike generator (SG) converts binary numbers into spikes train, and comprises a comparator.

Integrate-and fire (IAF), also called IAF counter or divider, counts the spikes received from the spike generator or local clock, and when the count value reaches the threshold, resets its counter and produce a single spike at the output.

Count-down counter(CDC) receives the number of input spikes in each clock period/cycle and counts down. The content of the count-down counter increases by the number of spikes received at that cycle and decreases by 1 because at that clock cycle one spike is generated and forwarded to the local clock generator (LCK);

Audio feature extractor extracts the audio features of the audio signal to be recognized, then the extracted audio features are encoded and delivered to the classifier.

Averaging window(AW) is used to average the input spikes in each frame period over an averaging window size, then yields the average number of spikes M(t).

Classifier executes the classification task and yields the classification results, and can be a decision tree or neural network, and neural network can be BNN, DNN or SNN.

One of the biggest problems in audio signal processing tasks is the background noise. For example, an audio classification device trained and tested in a silent office may not work properly in a busy street with huge traffic noise or in a busy cafeteria in the presence of people talking and laughing. One possible option is to use various training datasets in which various kinds of background noises are present. Unfortunately, this method is not practically feasible since one needs to collect a lot of data in different background noise scenarios. Moreover, in practice, the statistics of the background noise changes dramatically from one scenario to the other or even in the same scenario, e.g., consider a cafeteria with few or many number of people. In order to improve the robustness of the audio front end dealing with the variations of the background noise, a viable method is to use per-channel energy normalization (PCEN) as an alternative to the pointwise logarithm of mel-frequency spectrogram (logmelspec) for audio feature extraction.

Figure 5:
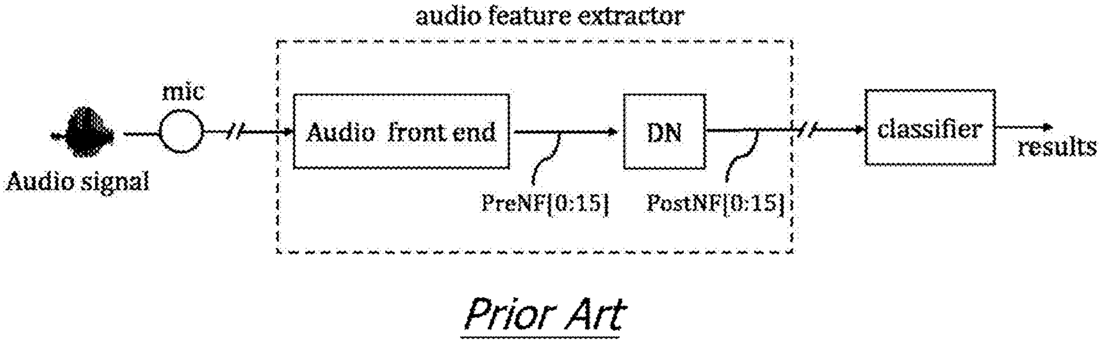
FIG. 5 is a block diagram of a normalized audio feature extractor.

FIG. 5 is a block diagram of a normalized audio feature extractor. Because of the output spikes rate (number of spikes per time unit) of audio front end is proportional to the instantaneous power at the output of the filter across time, the instantaneous signal power at the output of audio front end can be estimated by the number of spikes E(t) over a frame period, then averaged over the time averaging window by a low-pass filter to get the average M(t), further normalized by the following formula:

$$\frac{E(t)}{M(t)+EPS} \tag{1}$$

Where EPS>0(e.g., 1/24) is added to make sure that the normalized instantaneous power does not blow up when M(t) approaches zero (e.g., in a silent room with no background noise).

Figure 6:
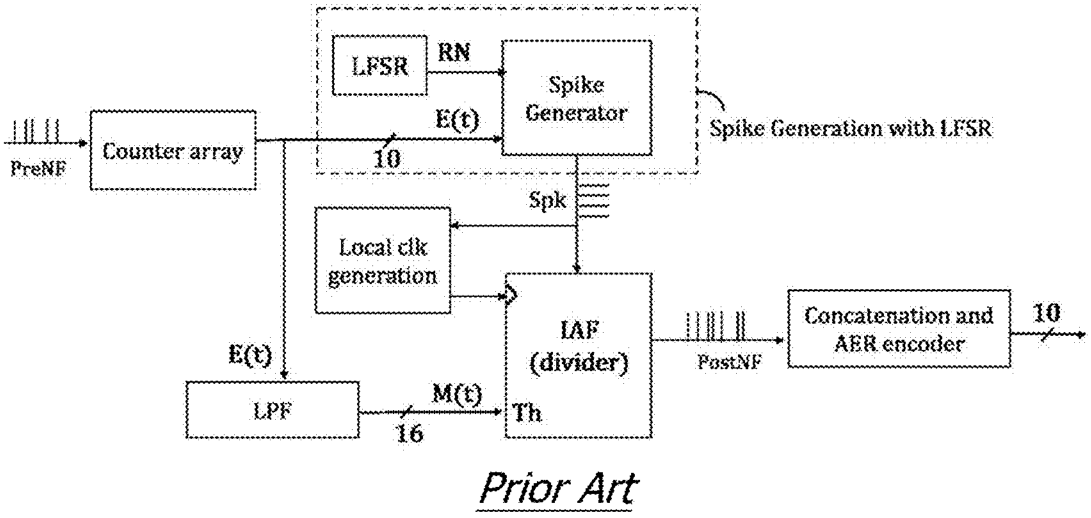
FIG. 6 is a block diagram of DN module per channel in REF1.

FIG. 6 is a block diagram of DN module per channel in REF1 ("A Background-Noise and Process-Variation-Tolerant 109 nW Acoustic Feature Extractor Based on Spike-Domain Divisive Energy Normalization for an Always-On Keyword Spotting Device", Dewei Wan et al, «2021 IEEE International Solid-State Circuits Conference»). Each spike channel of audio feature extractor is processed by an independent DN module, thus, a total of 16 DN modules corresponding to 16 filters in the audio front end. An LFSR module is used to generate random numbers (NR), which is shared among the 16 DN modules.

Figure 7:
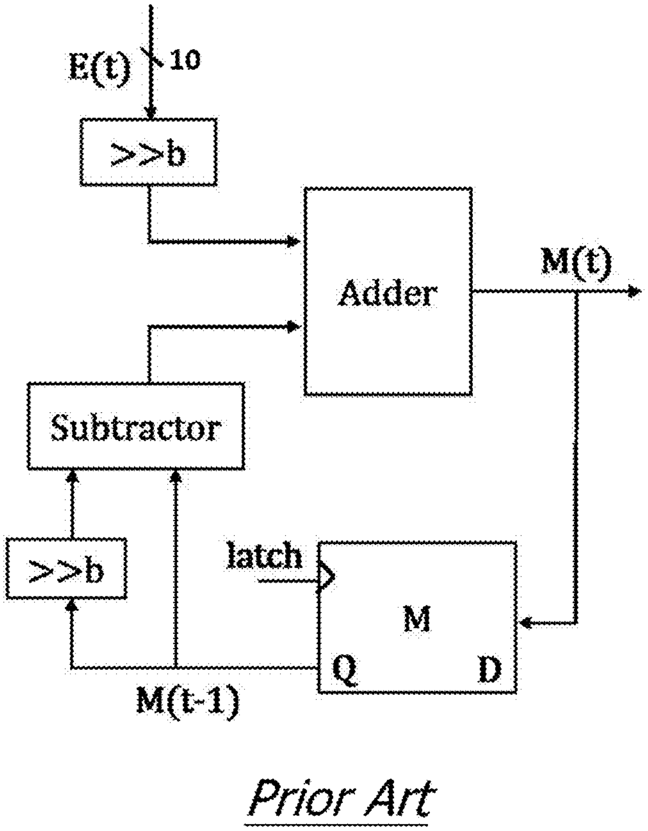
FIG. 7 is an embodiment of LPF for the device of FIG. 6.

FIG. 7 is an embodiment of LPF for the device of FIG. 6. DN module receives input spikes train PreNF, which is counted by a counter module to yield E(t). Then E(t) is averaged by a low-pass filter to produce the threshold parameter M(t)+EPS. Further βE(t) spikes are produced by the LFSR module as input to the local pulse generator and IAF counter. IAF employed as an integer divider in the spike domain to division to count and store the number of spikes it receive and when this number reaches the threshold M(t)+EPS, it resets its counter and produces a single spikes at the output.

The signal processing within each DN module consists in the following steps:

S11. Receive input spikes train.

S12. Divide the input spikes into frames of duration of duration 50 ms and the number of input spikes are added over the frame interval to estimate the instantaneous power, then it yields the signal E(t) where "t=0, 1, . . . " denotes the frame number/label. Further, the number of input spikes over a frame period (thus frame duration) is averaged by the low-pass filter to obtain M(t). The filter computes the average M(t) of E(t) as:

$$M(t+1)=(1-\alpha)M(t)+\alpha E(t) \tag{2}$$

where $a=\frac{1}{2}^b$ is an averaging parameter for some integer b, and can be selected by the frequency response of the audio signal and background noise. The filter (see, e.g., FIG. 7) is implemented specifically in REF1 as follow:

$$M(t+1)=M(t)-M(t)\gg b+E(t)\gg b \tag{3}$$

where b bit-shift (via operator) is going to be equivalent to dividing by $2^b$, >>b means the value M(t)/E(t) shifted b size to the right. If b=5, which yields an averaging window of $2^b$=32 frames. Considering 50 ms duration of each frame, this yields a total averaging window of duration of 1.6 s.

S13. E(t) is used to produce βE(t), and IAF counter takes βE(t) input spikes to count, when this count value reaches the threshold M(t)+EPS, it resets its counter and produces a single spikes at the output, thus, performing the desired normalization.

Spike generation comprises a LFSR and a spike generator, and the spike generator converts binary numbers into spikes train.

The spike generator compares the output of LFSR with E(t) at each clock period and a pulse is produced if it is less than E(t). For example, clock period is 0.1 ms and each frame (of duration 50 ms) consists of 500 clock periods. Since LFSR is just a deterministic digital circuit, its output sequence is not truly random and indeed it is a periodic sequence. If LFSR has 10 bits and produces a number in the range 0 up to $2^{10}$-1 and that is a pseudo-random sequence, namely, the numbers 0-1023 appear almost randomly and repeats with a period 1024. Since the value of E(t) remains the same over 500 clock period and the clock period of LFSR is the same with DN module (0.1 ms), which means the value of LFSR changes every clock period, E(t) is compared with 500 outputs of LFSR. Since the LFSR output is a pseudo-random sequence, the approximate number of output spikes over the frame period is given by:

$$500\times\frac{E(t)}{1024}\times\frac{p_{local}}{2}\times\frac{1}{M(t)+EPS}\approx\frac{p_{local}}{4}\times\frac{E(t)}{M(t)+EPS} \tag{5}$$

The local pulse generator has a Plocal (either lower case "p" or "P")times higher clock rate and converts each input spike into Plocal/2 output spikes. The factor ½ is due to the specific implementation of the local pulse generator.

Although the above method yields effective normalization, although it has several drawbacks which causes some system-level and signal processing issues as follows:

1) Single-Channel Statistical Distortion

The above method does not preserve the order of the spikes within the frame period. For example, suppose that E(t)=200 at a specific frame t. This method does not distinguish if these 200 spikes are coming mainly at the start of the frame t or perhaps at its end since given a specific value of E(t) it produces only random spikes using the Linear Feedback Shift Register (LFSR) module, and the output spikes of SG are distributed almost uniformly over the frame, which results that this method is unable to take the smallscale statistical correlation of the spikes into account, and it seems to be quite an important factor in the classification task performed in the SNN in the next layers.

2) Cross-Channel Statistical Distortion

Since a single LFSR for spike production is shared among all the 16 channels, the simulations of the above method show that the output spike channels seem to have almost a positive correlation factor, namely, when one channel fires so does the other channels with a high probability and vice versa. This is because spikes are produced when the output of LFSR is less than the spike counts E(t) in the channels. So if LFSR output is high, none of the channels can fire and vice versa when the LFSR output is low, all the channels fire simultaneously, thus, a cross-channel statistical distortion.

3) Dead-Zone of LPF

Averaging E(t) and producing M(t) by low-pass filter suffers from numerical quantization and takes a very long time to converge to its steady state. In the bit-shift implementation of the low-pass filter, b bit-shift (via operator) is going to be equivalent to dividing by $2^b$ in formula (4). Unfortunately, this is only true in floating-point representation but not bit-shift version in the integer representation implemented here. For example, if b=5 and E(t)<$2^b$, E(t)>>b is equal to 0 and is not seen at all by the filter. To avoid this, it needs the input spikes rate of the filter above 32/FD=32/50 ms=640 spikes/s, where FD denots the frame period. In other words, there is a dead-zone where rates less than 640 spikes/sec, which is a quite reasonable rate in audio tasks, are not seen by the DN module.

4) Latency

Since E(t) participates not only in the calculation of M(t), but also in the generation of βE(t) that IAF uses for counting, subsequent operations will only be performed only when the E(t) is reday. Since it is necessary to wait a frame duration (50 ms) to obtain E(0) in the first frame, there is a delay of 50 ms.

5) Power Consumption

Each channel of the audio front end has an independent DN module, and a total of 16 DN modules corresponding to 16 filters in the audio front end. Every DN module exists a series of concatenation to generate 16 output spikes trains to AER encoder. For the audio feature extractor, the 16 output spikes trains of the current frame and the 16 spike trains of the past 15 frames are concatenated to create 256D (16×16) feature vectors, which are too complex and consume a lot of power.

Meanwhile, since the LFSR is shared in all the channel, it will constantly consume power even if there are no spikes in some of the channels.

The present disclosure is devoted to improve the implementation of DN module to deal with the above-mentioned issues. The DN module with simpler structure, easier implementation, lower power consumption, and no cross-channel statistical distortion. In a single frame, if there is no input spikes, no output spikes is generated, avoiding latency and single-channel statistical distortion. The implementation of the filter is improved to avoid the problems of quantization and dead-zone, and the parameters of bit-shift b, frame duration/period, $P_{local}$ can be configured to make it flexible.

Figure 8:
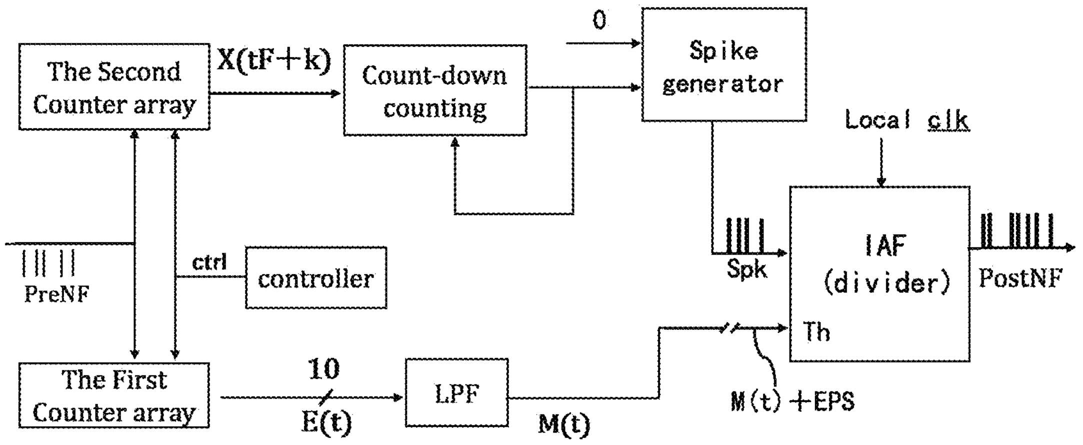
FIG. 8 is a block diagram of DN module per channel of the invention.

FIG. 8 is a preferred embodiment of the block diagram of DN module per channel of the present invention. Both step S12 and step S13 in REF1 are improved. At the same time, only steps S12 or S13 can be improved according to the actual situation. The present invention does not limit this. The specific implementation steps of divisive normalization are as follow:

S21. Receive input spikes train.

Receive input spikes train, and obtain the spike number or rate over a frame period;

S22. Yield the averaged values of the input spikes train in an averaging window to produce the threshold parameter.

In some embodiments, counting the number of input spikes over a frame period, and the number is averaged by the low-pass filter, and then produce the threshold parameter.

Firstly, the time is divided into frames of duration (frame duration or frame period, FD). The first counter module counts the number of input spikes over a frame period and yields E(t) where "t=0, 1, . . . " denotes the frame number/label.

Choose the frame period such that the number of spikes over the frame is a reasonably large number such that have a good averaging of the input rate over the frame. For example, if FD=50 ms, there is around 50-500 spikes over the frame for an input spike rate of 0.1K-1K spike/sec.

Secondly, the low-pass filter computes the average M(t) of E(t) to yield the threshold parameter. Optionally, the low-pass filter is smoothing filter. M(t) can be calculated as follow:

$$M(t)=\text{avg}E(t)=\text{avg}(r_{in}(t))\times\text{FD} \quad (6)$$

Where avgE(t) denotes the average value of E(t), rin(t) denotes the input spikes rate, FD denotes the frame period. Since the number of input spikes over the frame denoted by E(t) is a random value, stdE(t)/avgE(t) (where STD stands for standard deviation) is expected to be very small to avoid huge statistical fluctuations in E(t) around its mean.

Figure 9A:
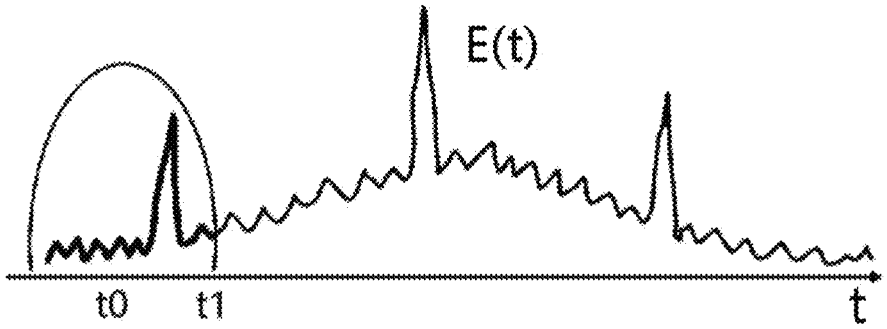
FIG. 9(*a*) is the averaging window of instantaneous power E(t) in DN with centers at t0.
Figure 9B:
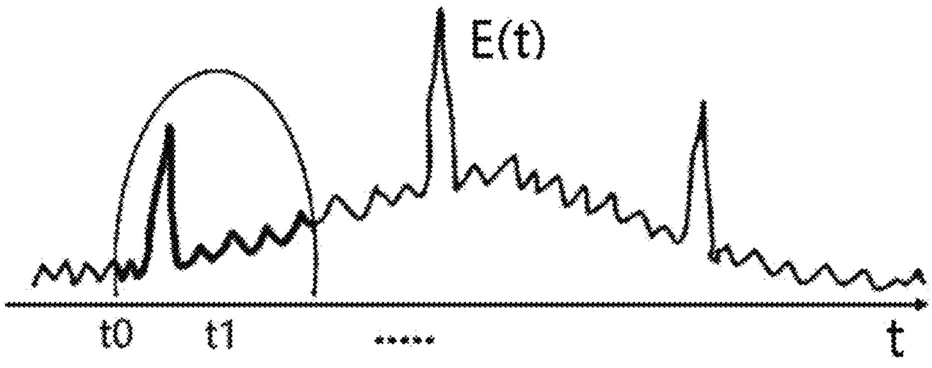

FIG. 9(*a*) and FIG. 9(*b*) is the averaging window of instantaneous power E(t) in DN with centers at t0 and t1, and high peaks correspond to the signal, and fluctuations in between belong to the background noise. M(t) is a function of time (e.g., M(t0) and M(t1) for the windows with centers at t0 and t1). Short blobs denote desired signal duration. By a careful analysis, if the averaging window duration is much larger than the desired activity duration of desired signal duration, the DN can reduce the time-varying background noise to a constant level, but big averaging window size is bad for the estimation of the average instantaneous power. Meanwhile, if the averaging window is quite short and of the same order of desired signal duration, DN can potentially average and eliminate the desired signal itself. So, the selection of AW (Averaging window) size is a difficult problem in practice. It needs to choose the averaging window size small enough to have a good estimate of the average instantaneous power and large enough to not to kill the desired signal.

Different audio processing scenarios take different size to average the background noise energy. Choose the size of the averaging window by the specific task (statistics of audio signal and background noise), and then compute the bit-shift parameter b of LPF as follow:

$$\text{AW}=2^b\times\text{FD} \quad (7)$$

Where if FD=50 ms and AW=1.6 s, b=5 can be obtained by formula (7). At the same time, one can make frame duration shorter but then one should increase suitably in order to have the same time averaging behavior by the above formula.

The LPF of present invention is improved to avoid the problems of quantization and dead-zone issues. The LPF tracks and saves the value of N(t)=M(t)«b with higher precision implementation, instead of M(t), and the filter is implemented the following:

$$N(t+1)=N(t)-N(t)\gg b+E(t) \tag{8}$$

obtain the desired threshold (averaging parameter) M(t) through:

$$M(t)=N(t)\gg b \tag{9}$$

the N(t) computed by the low-pass filter is used to produce M(t)=N(t)»b which is then used as a threshold parameter for the IAF counter, where b denotes the bit-shift size, t denotes the frame number/label, E(t) and M(t) denote the number/average number of spikes over a frame, and M(t) is N(t)»b.

with this simple modification, even $E(t)<2^b$ can be recognized by the filter, thus the filter can process the whole E(t) and does not suffer from the qunatization error due to truncation in M(t)»b of formula (3) in the previous method. Since all values of E(t) are taken into account in this implementation, the minimum input spike rate processed by the filter is $$r_{LPFmin}=\frac{1}{FD}=\frac{1}{50\text{ ms}}=20\text{ spikes}/s \tag{10}$$

Therefore, this method eliminates the dead-zone for input rates less than 640 spikes/sec that existed in the previous implementation.

Bit-shift parameter is configurable, programmed and modified. Since the performance of DN module depends on the rate of background noise statistics changing with time, the averaging window size of low-pass filter can be configured through the shift parameter b to adapt to different scenarios, which is huge flexibility. For example, the filter configurable by letting bit-shift parameter b selected in the range 1-7 during the chip reset and initialization. For these ranges of the parameter b, the averaging window size of DN is within the range 2×50 ms-$2^7$×50 ms, namely, within 100 ms-6.4 sec.

S23. Decide whether to enable the IAF module counting in each clock cycle. When the count value of IAF reaches the threshold, IAF generates an output spike and the starts counting again. The process comprise the following steps:

S231. The second counter module counts the number of input spikes PreNF over a clock period, then loads into count-down counter. The result of count-down counter increases with the number of input spikes obtained during a clock cycle and decreases per clock cycle.

The input spikes PreNF come from the output of corresponding channel in audio front-end. PreNF can be asynchronous, namely, one may receive more than one spike over the clock period. However, since the DN module works with the synchronous clock of 0.1 ms, one can process only a single spike per clock period. This can be considered like a queue where the customers (spikes) may come at any time but they can be only served one-customer per clock period. The count-down counter can be seen as a queue that stores the incoming spikes.

S232. Every clock period, the output of the count-down counter is compared with 0 and as far as there are newly-arriving spikes or some past spikes that are not yet processed, the output of count-down counter is the activation signal 1, which makes a transition to 0 if there are no new input spikes to be processed. When this activation signal is 1, the local clock pulses are forwarded to IAF counter wherein these pulses are counted and a spike is produced when their count reaches the IAF threshold M(t)+EPS.

For example, suppose DN module receives 2 spikes in first clock period and counted by the second counter module to load to count-down counter. Suppose there was no past value, count value of count-down counter is 2 and since it is larger than 0, a 1 signal is produced permitting spike production at the output. Then, at the next clock, count-down counter counts down to 1 with no other input spikes and since 1 is still larger than 0, a 1 signal is produced permitting another clock cycle of spike production. In the next cycle, count-down counter reaches 0 with no other input spikes and the spike generation permission is set to 0. So, it is seen that the count-down counter makes sure that all the input spikes are suitably processed. If there is a single new input spike in the middle clock, the result of count-down counter is 2 and since 2 is larger than 0, a 1 signal is produced permitting spike production at the output, and so on.

Specifically, the count-down counter processes as follows:

i) The clock period of the DN module is Tclk. Assuming that each frame period FD consists of F clock cycles, thus FD=F×Tclk. The clock cycles within frame are marked as tF+k, where k=1 . . . F.

The second counter module counts the number and yield X(tF+k) that denotes the number of input spikes within clock cycle "k" in frame "t" where F denotes the number of clock cycles within a single frame.

ii) the result of count-down counter increases by the number of input spikes obtained during a clock cycle and decreases by 1 per clock cycle.

The value of count-down counter can be expressed by the following formula:

$$\mathrm{cdc}(\mathrm{tF}+k)=(\mathrm{cdc}(\mathrm{tF}+k-1)+X(\mathrm{tF}+1)-1)+ \tag{11}$$

for clock cycles within frame, where for a number x we define (x), as follows, if the variable x inside the bracket is not 0, it prints itself, and if the variable x is 0, it prints 0, it means reseat the counter.

$$(x)_+=\begin{cases}x & \text{if } x>0\\ 0 & \text{if } x\le 0\end{cases} \tag{12}$$

If the content of count-down counter is larger than 0, one spike is generated and forwarded to the local clock generator. So, the count down counter makes sure that all the input spikes are suitably processed, and no output spike is produced if there are no input spikes, over a single frame. And avoids the single-channel statistical distortion. Since there is no LFSR, it avoids the cross-channel statistical distortion.

As a divider, IAF counter generates the output of DN module. The spike generated by SG is input to the IAF counter and the local clock is forwarded to the IAF counter. As each of input spikes over the frame are multiplied by a factor due to local clock and divided by the threshold M(t)+EPS in the IAF counter. A formula for the approximate number of output spikes Nout(t) over a frame t as $$N_{out}(t)=p_{local}\times\frac{E(t)}{M(t)+EPS} \tag{13}$$

Where E(t) and M(t) denote the number/average number of spikes. Thus, the output pulse rate of split normalization can be adjusted by using the local clock factor $P_{local}$.

Compare with the output spikes of formula (5), the present invention has the same number of spikes with a 4 times lower local clock frequency, which may yield additional saving in power.

As each of input spikes over the frame are multiplied by a factor due to local clock and divided by the threshold in the IAF counter. So, if we divide this number by "frame duration" we obtain the output spike rate as $$r_{out}(t) = \frac{N_{out}(t)}{FD} = p_{local} \times \frac{E(t)}{M(t) + EPS} \times \frac{1}{FD} \tag{14}$$

Rout(t) is almost independent of the frame duration due to normalization of E(t) by M(t). As a result, the output spike rate will be proportional to $$r_{out}(t) \propto \frac{P_{local}}{FD} \tag{15}$$

So, for a given target output spike rate, one can reduce the frame duration to also reduce the frequency of the local clock (parameter $P_{local}$). This may yield some additional saving in power. For selected frame duration, the output spike rate can be adjusted via $P_{local}$. The main purpose of divisive normalization is to make sure that this minimum output spike rate (also called the background spike firing rate)

$$\frac{P_{local}}{FD}$$

does not vary by slow variation of the background noise. Of course, in the presence of the desired signal, the output spike rate has large jumps, which is favourable as it helps SNN to detect the signal and estimate its parameters.

The input spike rate $r_{in}(t)$ is $$r_{in}(t) = \frac{E(t)}{FD} \tag{16}$$

So, the relationship between output spike rate and input spike rate is $$r_{out}(t) = p_{local} \times \frac{r_{in}(t)}{avg(r_{in}(t)) \times FD + EPS} \tag{17}$$

Above all, the DN module comprises input module, the first counter module and normalization module. The normalization module comprises the second counter module, count-down counter, SG without LFSR, IAF counter. The input module receives input spikes PreNF. On the one hand, the first counter module counts the number E(t) of input spikes over a frame period, and E(t) is averaged by a low-pass filter to produce the threshold parameter M(t)+EPS. On the other hand, the second counter module counts the number X(tF+k) of input spikes over a clock period, then processed by count-down counter and SG without LFSR to enable the counting of the Integrate-and fire(IAF) counter, if the value of count-down counter reaches threshold, it resets IAF counter and produce a single spike at the output to normalization.

The structure of the first counter module and second counter module is the same, the only difference is the first counter module counts the number of input spikes over a frame period and yields E(t), and the second counter module counts the number of input spikes, then delivered to count-down counter. The count-down counter counts down over a clock period and yields X(tF+K).

In some optimal embodiments, input spikes PreNF can be asynchronous spikes or synchronous spikes.

Figure 10:
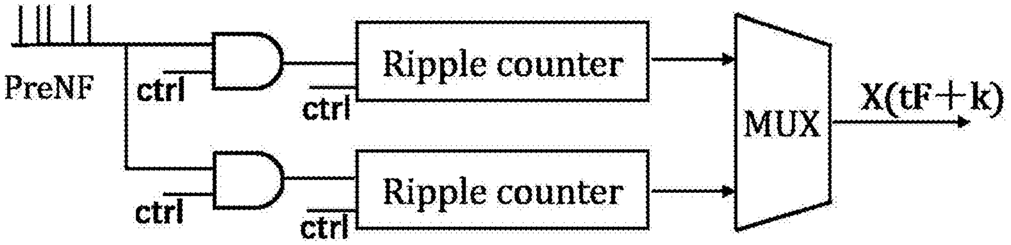
FIG. 10 is a possible embodiment of the first counter module and the second counter module for asynchronous input spikes.

In some embodiments, if input spikes PreNF is asynchronous spikes, each of the first count counter module and the second counter module comprises two counters called the first and second counter for alternate count, and also called ping-pong count. In an alternative embodiment, the two counters have no clock and they work asynchronously and independently of the clock of divisive normalization module. Optionally, the two counters can be ripple counters and illustrated in FIG. 10.

In an alternative embodiment, if input spikes PreNF is asynchronous spikes, one can convert the asynchronous spikes to synchronous spikes, then counted by a counter, further delivered the output of the counter within a period of time to a corresponding register. Optionally, the counter have clock and can be digital counter.

Figure 11:
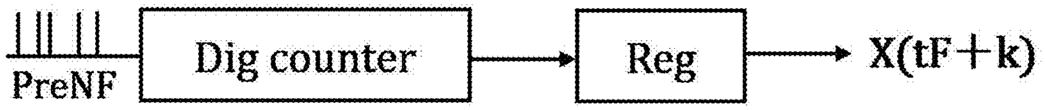
FIG. 11 is a possible embodiment of the first counter module and the second counter module for synchronous input spikes.

In some optimal embodiments, input spikes PreNF is synchronous spikes. FIG. 11 is a possible embodiment of the first counter module and the second counter module for synchronous input spikes. Every counter module comprises a single counter called the third counter and a register. The third counter counts the number of PreNF and delivers the output of the third counter within a period of time to a corresponding register. Optionally, the third counter have clock and can be digital counter.

Figure 12:
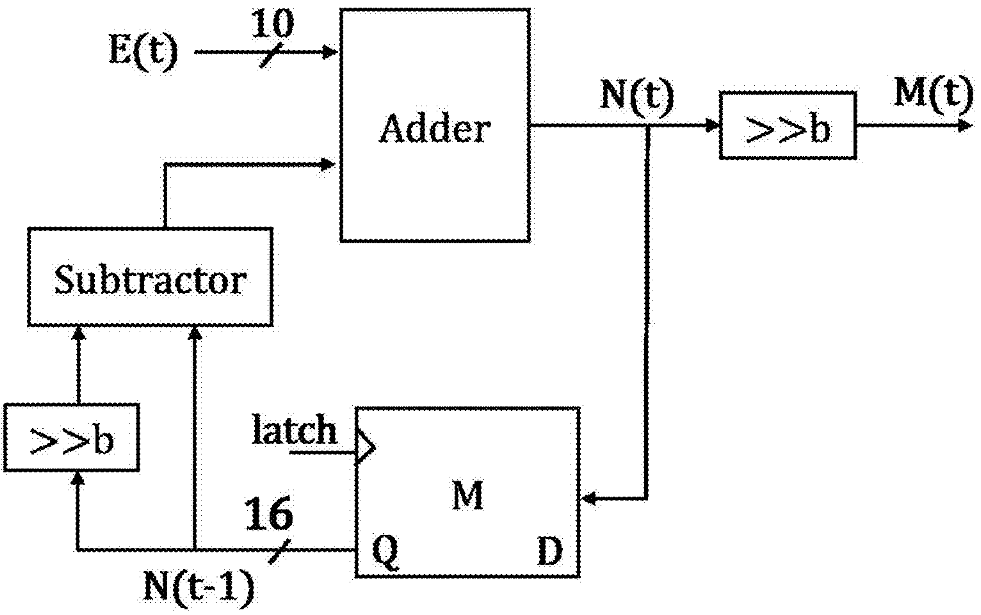
FIG. 12 is a possible embodiment of LPF for the device of FIG. 8.

In some embodiments, FIG. 12 is a possible embodiment of LPF for the present invention. The LPF comprises adder, shifters, subtractor and latch. The low-pass filter saves and tracks the value of N(t)=M(t)«b rather than M(t) to obtain the average M(t) of E(t), as shown in formula (7) and (8), where b is a shift parameter. Especially, the low pass filter can be a smoothing filter.

The second counter module and count-down counter help the input spikes PreNF to be convert into synchronous spikes to adapt the clock period of DN module, and which makes sure all the input spikes are suitably processed.

The count-down counter saves the number X(tF+K) of the second counter module, and the result of count-down counter increases by the number of input spikes obtained during a clock cycle and decreases by 1 per clock cycle.

The spike generator uses a comparator to compare the output of count-down counter with 0, and when it is larger than 0, the spike generator generates an enable spike.

The Integrate-and fire(IAF) counter counts and saves the number of input sipkes. When there is an enable spike, the local clock pulses go to the IAF where these local clock pulses are counted and thresholded by M(t)+EPS to produce the output spikes. Thus, the IAF module is a counter, and since the IAF module performs division, it is called divider too.

In another alternative embodiments, the DN module comprises a local clock generator, the spikes generated by count-down counter and spike generator are fed to the IAF counter, and act as the enable signal of the local clock generator to generate the local clock required by IAF counter.

In another alternative embodiments, the DN module comprises a multiplier for increasing the number X(tF+k) loaded to count-down counter. As a result, the number of output spikes within a frame duration is given by $$N_{out}(t) = p_{local} \times \frac{\gamma \times E(t)}{M(t) + EPS} \quad (18)$$

Where E(t) and M(t) denote the number/average number of spikes over a frame where we label the frames by t, and EPS is a constant greater than 0, and $\gamma$ is the multiple. Wherein said multiplier implemented by shift registers, such as X(tF+k)«2, and $\gamma$ is adjustable.

In another alternative embodiments, there is AER encoder for encoding the input spikes or output spikes of the divisive normalization device. AER encoder acts as an interface and can be used anywhere, and can be integrated into the DN module or placed outside the DN module, or between the audio front end and the DN module, or behind the DN module.

DN module is a part of the audio feature extractor. One can choose the parameters (such as shift parameters b, Plcoal duration, frame period, etc.) to ensure the extracted features (output of the DN module) are high quality features, and then forwarded to the classifier to perform the classification task, as a result the classifier has very good performance There is an AER decoder corresponding to AER encoder. Similarly, AER decoder can be integrated within the classifier or placed outside the classifier, such as between the DN module and the network model.

The audio feature extractor in present invention comprises audio front end and DN module. audio front end processes the original audio signal collected by microphone and yields pre-normalized spikes train for each channel, where PreNF [0:15] corresponding the 16 channels. DN module processes the pre-normalized spikes train for corresponding channel and yields post-normalized spikes train. It can be implemented in the analog domain, digital domain or digital-analog hybrid domain.

Figure 2A:
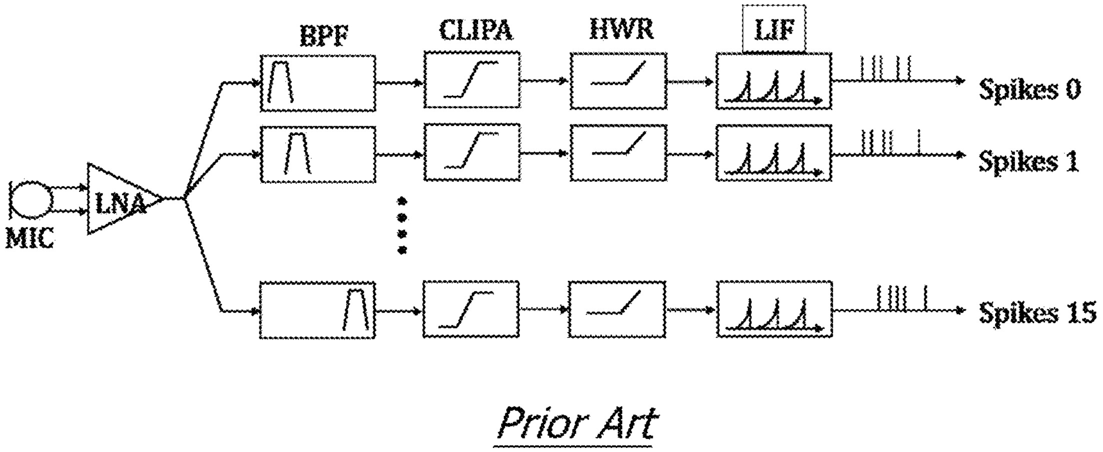
FIG. 2(*a*) is an embodiment of ASP in prior art.
Figure 2B:
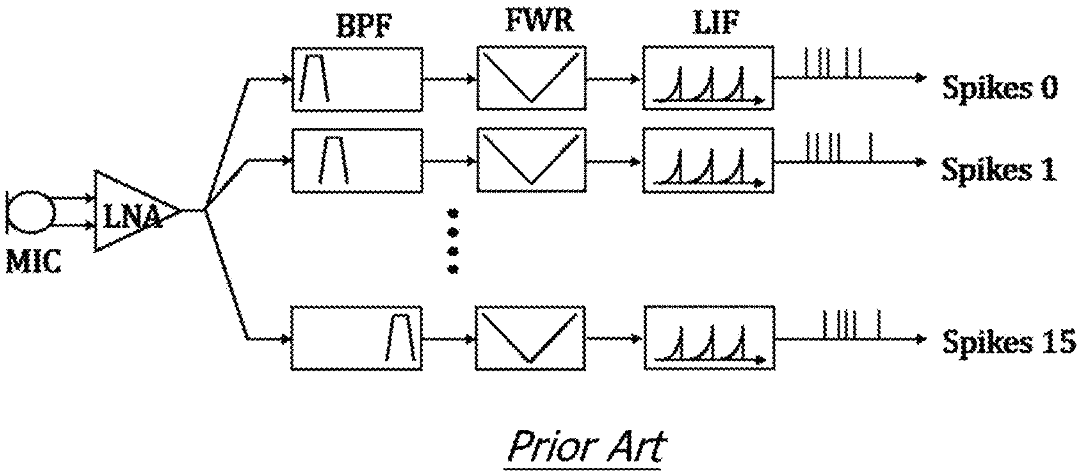
Figure 3:
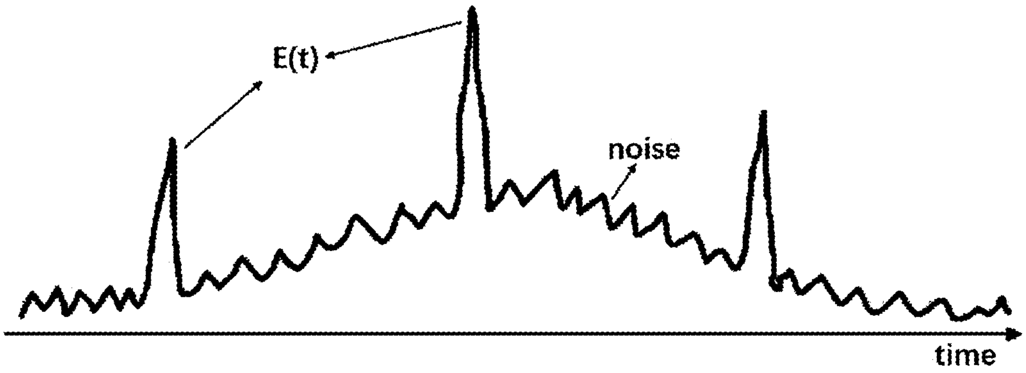
FIG. 3 is the illustration of the variation of the background noise at the output of a specific filter in the ASP.
Figure 4:
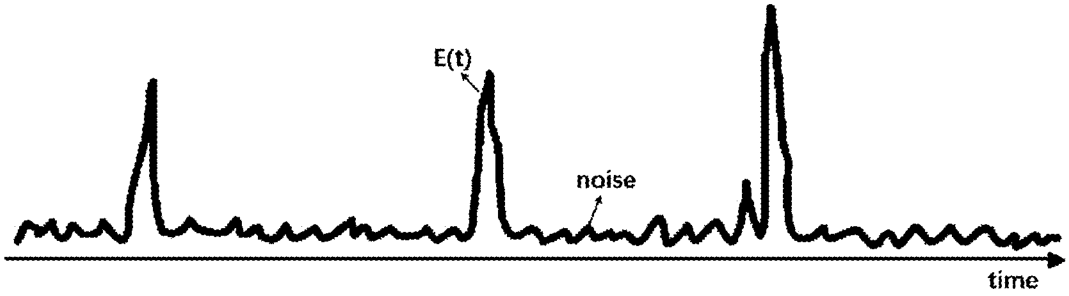
FIG. 4 is the illustration of FIG. 3 after suitable divisive normalization.
Figure 13:
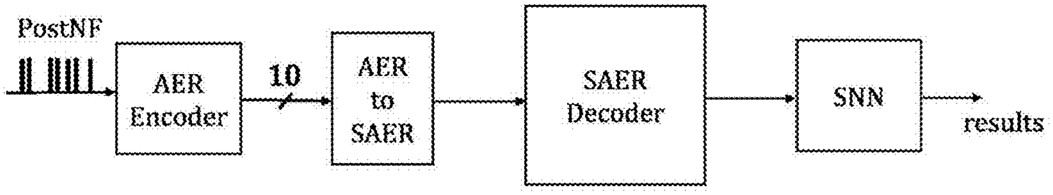
FIG. 13 is a possible embodiment of audio front end of the invention.

FIG. 13 is a possible embodiment of audio front end of the invention. the audio signal is collected by the microphone amplified by a LNA, which is then filtered by a bandpass filter (BPF) in each of the 16 parallel channels. In every channel, there is BPF, rectifier and event production, and the input of LPF is coupled to the output of the LNA, the output of the bandpass filter is coupled to the input of the rectifier, and the output of the rectifier is coupled to the event production module. The event production module is used to generate spike events.

Wherein there are full-wave rectifier and half-wave rectifier, technicians can choose based on the design requirements. The event production module can be a LIF event production module, and further be a IAF event production module. IAF (integrate and fire) is a special case of LIF (leaky integrate and fire) when the time-constants of the analog circuits are very large (e.g., large resistors and capacitors in the current implementation) such that the leak is almost negligible. Please note that the IAF event production module or LIF event production module of the audio front end in FIG. 2 or/and FIG. 13 works in the analog domain with continuous-time signals, which is different from the IAF counter/divider in the DN module (as shown in FIG. 8). The IAF counter works in the digital domain to accumulate local clock pulses and compare them with thresholds to produce output pulses.

In another alternative embodiments, audio front end comprises a clipping amplifier CLIPA, which is coupled in BPF and rectifier and used to further amplify the signal after BPF.

Figure 14:
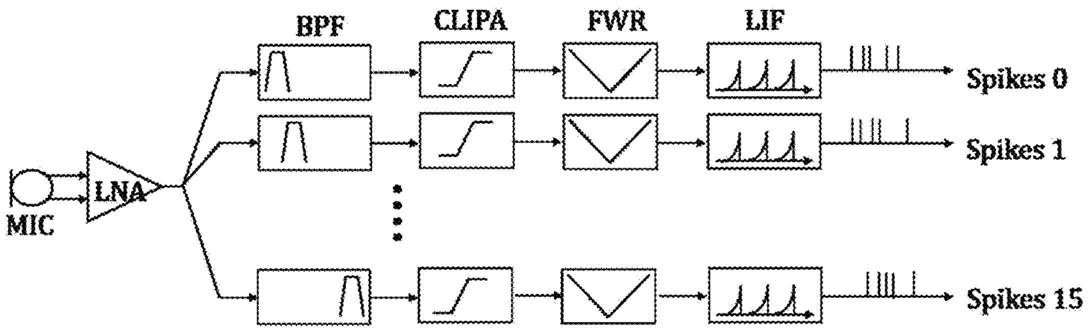
FIG. 14 is a possible embodiment of audio feature extractor comprising AER encoder, AER to SAER.

In another alternative embodiments, there is AER to SAER (Serial Address event representation) to convert parallel data into Serial data. FIG. 14 is a possible embodiment of audio feature extractor comprising AER encoder, AER to SAER. The output of IAF counter is processed by AER encoder, AER to SAER, and then decoded by SAER decoder, further loaded to classifier to perform the classification task and output the classification results.

Figure 15:
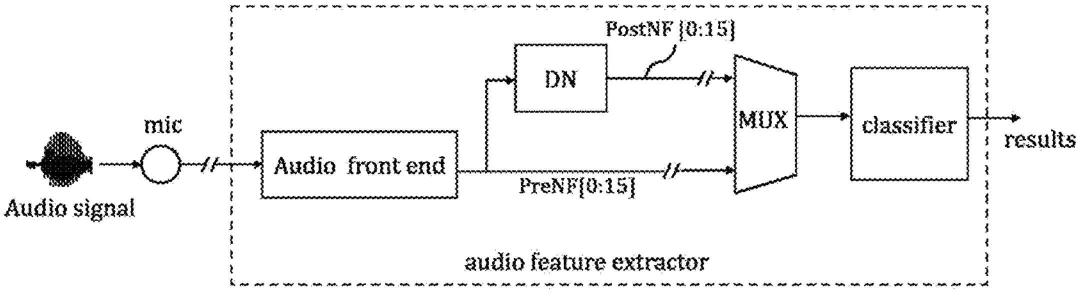
FIG. 15 is another possible embodiment of audio front end of the invention.

In another alternative embodiments, one can selects where executing the normalized, as shown in FIG. 15, a path to normalize PreNF, another path forward PreNF directly to the classifier. It is very flexibility.

Figure 16:
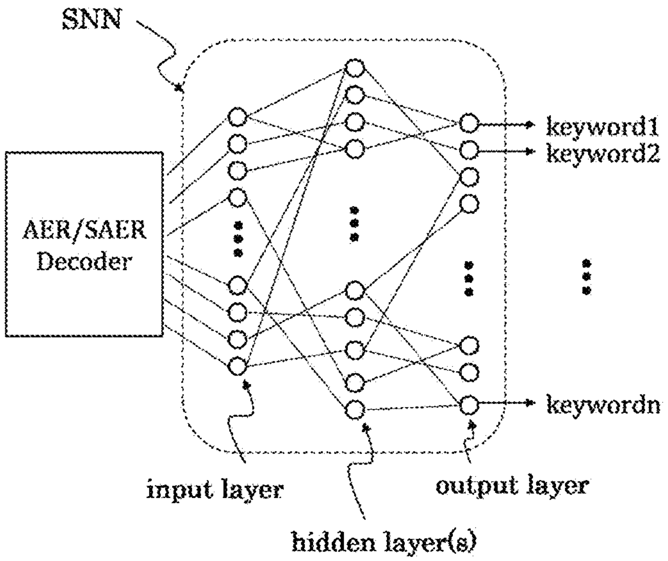
FIG. 16 is the illustration of KWS system consisting of audio feature extractor and SNN classifier chip.

In some alternative embodiments, a provided chip comprising normalized audio feature extractor and classifier with divisive normalization as described earlier. The classifier executes the classification task depending on the output spikes of the audio feature extractor, and it can be implemented by software, hardware or combination of software and hardware. Specifically, it can be decision tree, neural network, etc. Neural network can be binary neural network (BNN), deep neural network (DNN), Spiking neural network (SNN), and SNN can be wave sense. Further, the chip is a neuromorphic chip or a brain-inspired chip. FIG. 16 is the illustration of KWS system consisting of audio feature extractor and SNN classifier chip.

Figure 17:
FIG. 17 is the comparison of the output spikes for REF1 and our proposed DN without LFSR.

FIG. 17 is the comparison of the output spikes for REF1 and our proposed DN without LFSR. The vertical axis from bottom to top is the input spikes, the output result of DN module without LFSR of present invention, and the output result of DN module with LFSR of REF1.

Note that the number of output spikes is normalized very well in DN method of the present invention, and method in REF1 produces some random spikes at time instants at which there are no input spikes, thus, the single channel statistical distortion mentioned previously. The DN module without LFSR of the invention performances better, tracking the distribution of the input spikes better and preserving the statistical information on the spikes even on a very small time scale.

So, the divisive normalization of the present invention with simpler structure, easier implementation and higher accuracy can have better statistical performance, and lower cost and power consumption.

The invention improves the implementation of LPF, has no latency, avoids the problems of quantization and rate dead-zone, and has higher accuracy. Divisive normalization without LFSR is easier to be implemented, has a simpler structure, a lower cost, a lower power consumption and chip area, has no single-channel statistical distortion and cross-channel statistical distortion.

The prior art uses random numbers produced by an LFSR to produce the output spikes. Thus, the divisive normalization module may produced random spikes especially at times in which there is no input spikes. Divisive normalization of the invention, in contrast, preserves the location (support) of the spikes. Divisive normalization of the invention can be configured with better flexibility and can adapt to different audio signal processing scenarios. Divisive normalization of the invention can process asynchronous input spikes or synchronous input spikes. The invention retains the integrity of input spikes information and the independence between different channels with better robustness, higher accuracy, faster processing speed and lower power consumption.

Since we can't depict the whole effective solutions, we will combinate the attached figures to introduce the key contents in the solution of each embodiment clearly and completely. The solutions and details which are not disclosed in the words below are the targets or technical characters that can be implemented by common methods in this field. Due to space limitations, we won't disclose that here.

Unless it means division, the character "/" means "OR" logic in any place of this invention. The descriptions such as "the first", "the second" are used for discrimination, not for the absolute order in spatial or temporal domain, and not indicate that the same terminologies defined by this description and other attributes mustn't refer to the same object.

This invention will disclose the key point for compositing different embodiments, and these key contents constitute different methods and productions. In this invention, even though the key points are only described in methods/productions, it indicates the corresponding productions/methods comprising the same key points explicitly.

The procedure, module or character depicted in any place of this invention, does not indicate it excludes others. The technician of art may get other implements with the help of other methods after reading the disclosed solutions in this invention. Based on the key contents of the implements in this invention, the technician of art has the ability to substitute, delete, add, combine, adjust the order of some characters, but get a solution still following the basic idea of this invention. These solutions within the basic idea are also located in the protection field of this invention.

What is claimed is:

1. A divisive normalization method comprising:

S1: receiving input spikes train;

S2: yielding averaged values of the input spikes train in an averaging window to produce a threshold parameter; and S3: deciding whether to enable an integrate-and-fire (IAF) counter counting via the number of input spikes in each clock period, and when a count value of the integrate-and-fire counter reaches the threshold parameter, producing a single output spike and performing reset, wherein a size of the averaging window comprises at least one frame period, and the frame period comprises at least one clock period;

wherein the input spikes train is a pre-normalized spikes train yielded by audio front end;

wherein the audio front end processes an original audio signal collected by a microphone and yields the pre-normalized spikes train.

2. The divisive normalization method of claim 1, wherein said S2 specifically comprises obtaining the spike number or a spike rate over each frame period in the averaging window, and then averaging the spike number or rate by a low-pass filter to produce the threshold parameter.

3. The divisive normalization method of claim 2, wherein the low-pass filter tracks and saves N(t) according to the following update equation $$N(t+1)=N(t)-N(t)\gg b+E(t);$$

the N(t) is shifted to the right by b bits to get the average value M(t), and M(t) is used as the threshold parameter for the IAF counter, where b denotes a bit-shift size, t denotes a frame number/label, E(t) and M(t) denote a total number and average number of spikes over a frame, respectively, and M(t) is $N(t)\gg b$.

4. The divisive normalization method of claim 1, wherein in said S3, a count-down counter receives the number of input spikes and counts down in every clock period; said S3 further comprises comparing the output of the count-down counter with 0 and judging whether the output is larger than 0, wherein local clock pulses are forwarded to an integrate-and-fire counter wherein these local clock pulses are counted, and a spike is produced when their count reaches the threshold parameter of the integrate-and-fire counter.

5. The divisive normalization method of claim 1, wherein said bit-shift size parameter b or local clock pulses or the frame period is adjustable.

6. The divisive normalization method of claim 1, wherein said input spikes are asynchronous spikes or synchronous spikes.

7. A divisive normalization device comprising:

an input module which receives an input spikes train;

and a threshold calculation module which yields a threshold parameter according to the average values of the input spikes train in an averaging window; and a normalization module which decides whether to enable an integrate-and-fire (IAF) counter counting via the number of input spikes over a clock period, when a value of the IAF counter reaches the threshold parameter, the IAF counter produces a single spike at the output and resets the counter, wherein an averaging window size of the averaging window comprises at least one frame period, and the frame period comprises at least one clock period;

wherein the input spikes train is a pre-normalized spikes train yielded by audio front end; wherein the audio front end processes an original audio signal collected by a microphone and yields the pre-normalized spikes train.

8. The divisive normalization device of claim 7, wherein said threshold calculation module comprises a first counter module and a low-pass filter, wherein the first counter module obtains the spike number or a spike rate over each frame period in the averaging window, then averaging the spike number by the low-pass filter to produce the threshold parameter.

9. The divisive normalization device of claim 7, wherein the low-pass filter tracks and saves N(t) according to the following update equation $$N(t+1)=N(t)-N(t)\gg b+E(t);$$

the N(t) is shifted to the right by b bits to get the average value M(t) which is then used as a threshold parameter for the IAF counter, where b denotes a bit-shift size, t denotes a frame number/label, E(t) and M(t) denote a total number and average number of spikes over a frame, respectively, and M(t) is $N(t)\gg b$.

10. The divisive normalization device of claim 7, wherein said normalization module comprises a second counter module, a count-down counter, a spike generator and the integrate-and-fire counter; the second counter module counts the number of input spikes over each clock period over the frame period, then the number is loaded into the count-down counter, and the output of the count-down counter decreases by 1 at that clock period by the number of input spikes received; and the spike generator compares the output of the count-down counter with 0 and judging whether the output is larger than 0, local clock pulses are forwarded to the integrate-and-fire counter wherein these local clock pulses are counted, and a spike is produced when their count reaches the threshold parameter of the integrate-and-fire counter.

11. The divisive normalization device of claim 7, wherein said normalization module comprises a multiplier for increasing the number of input spikes obtained during each clock period over the frame period.

12. The divisive normalization device of claim 7 wherein said input spikes are asynchronous spikes or synchronous spikes, when said input spikes are asynchronous spikes, both the first counter module and a second counter module comprise two counters for alternate count, and the two counters have no clock, or when said input spikes are asynchronous spikes, the asynchronous spikes are converted to synchronous spikes, and then counted by a counter having a clock, or when said input spikes are synchronous spikes, both the first counter module and second counter module comprise a counter having a clock and a register.

13. The divisive normalization device of claim 12, wherein said the two counters having no clock are ripple counters and/or the counter having a clock is a digital counter.

14. A chip, comprising: a normalized audio feature extractor which comprises an audio front end and the divisive normalization device of claim 7, wherein the audio front end processes an original audio signal collected by a microphone and yields a pre-normalized spikes train for each channel, and the divisive normalization device is configured to process the pre-normalized spikes train for a corresponding channel and yields a post-normalized spikes train, and a classifier executing a classification task depending on output spikes of the audio feature extractor.

15. The chip of claim 14, wherein said classifier is a decision tree or neural network, and the neural network can be a binary neural network, a deep neural network or a spiking neural network.

16. The chip of claim 15, the chip also comprises an Address Event Representation (AER) to Synchronous Address Event Representation (SAER) module to process the output spikes of the audio feature extractor before the output spikes are passed to the classifier.

17. The chip of claim 14, wherein said audio front end comprises a low-noise amplifier (LNA) that amplifies the audio signal, which is then filtered by a bandpass filter in channels, a rectifier is coupled to an output of the bandpass filter to rectify, and an event production module is coupled to an output of the rectifier to produce the pre-normalized spikes train.

18. The chip of claim 14, wherein the normalized audio feature extractor also comprises a selector to decide whether to normalize the pre-normalized spikes train to the post-normalized spikes train.

19. The chip of claim 14, wherein the normalized audio feature extractor also comprises an AER encoder for encoding the input spikes or the output spikes of the divisive normalization device, wherein said AER encoder is integrated into the divisive normalization device or placed outside the divisive normalization device.

* * * * *